United States Patent
Tsai et al.

(10) Patent No.: US 9,389,778 B2
(45) Date of Patent: Jul. 12, 2016

(54) IMAGE CAPTURING METHOD OF TOUCH DISPLAY MODULE AND ELECTRONIC DEVICE

(71) Applicant: ASUSTeK COMPUTER INC., Peitou (TW)

(72) Inventors: Hung-Yuan Tsai, Taipei (TW); Yi-Lung Tsai, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 45 days.

(21) Appl. No.: 13/943,147

(22) Filed: Jul. 16, 2013

(65) Prior Publication Data

US 2014/0184529 A1 Jul. 3, 2014

Related U.S. Application Data

(60) Provisional application No. 61/746,564, filed on Dec. 28, 2012.

(30) Foreign Application Priority Data

Apr. 10, 2013 (TW) .............................. 102112672 A (51) Int. Cl.
   *G06F 3/0488* (2013.01)
   *G06F 3/0484* (2013.01)
(52) U.S. Cl.
   CPC ........ *G06F 3/04883* (2013.01); *G06F 3/04842* (2013.01)

(58) Field of Classification Search
   None
   See application file for complete search history.

(56) References Cited

U.S. PATENT DOCUMENTS

| 2012/0092269 A1* | 4/2012 | Tsai et al. ...................... 345/173 |
| 2014/0253470 A1* | 9/2014 | Havilio ......................... 345/173 |

FOREIGN PATENT DOCUMENTS

| CN | 101075172 | 11/2007 |
| EP | 0782066 | 7/1997 |
| TW | 201042515 A1 | 12/2010 |
| TW | 201216150 A1 | 4/2012 |

OTHER PUBLICATIONS http://tech.hexun.com/2012-09-28/146346073.html, website, Sep. 28, 2012.

* cited by examiner

*Primary Examiner* — Kenneth B Lee, Jr.
(74) *Attorney, Agent, or Firm* — Muncy, Geissler, Olds & Lowe, P.C.

(57) ABSTRACT

An image capturing method of a touch display module is disclosed. The image capturing method includes the steps of defining a first axial; defining a second axial which is perpendicular to the first axial; detecting a motion track on the touch display module, wherein the motion track includes at least an angle or a curve; calculating a first length which is the length of the motion track projecting to the first axial; calculating a second length which is the length of the motion track projecting to the second axial; and capturing a selecting range according to the first length and the second length. This invention also discloses an electronic device.

14 Claims, 9 Drawing Sheets

IMAGE CAPTURING METHOD OF TOUCH DISPLAY MODULE AND ELECTRONIC DEVICE

CROSS-REFERENCE TO RELATED APPLICATION

This application claims the priority benefit of U.S. provisional application Ser. No. 61/746,564, filed on Dec. 28, 2012, and Patent Application No. 102112672 filed in Taiwan, Republic of China on Apr. 10, 2013. The entirety of the above-mentioned patent applications are hereby incorporated by reference herein and made a part of specification.

BACKGROUND OF THE INVENTION

1. Field of the Invention

The invention relates to an image capturing method and, more particularly, to an image capturing method of a touch display module.

2. Description of the Related Art

In recent years, many portable electronic devices, such as smart phones or tablet computers have a touch display (a touch display module) instead of a keyboard in a conventional computer system, and users can directly input information via the touch display. In conventional computer systems, users need to press the "print screen" key to capture an image of the screen, and then copy and paste the image of the screen to an image processing program to edit or store. However, many keyboards of portable electronic devices are replaced by touch displays, and thus the capturing screen function cannot be executed in portable electronic devices without keyboards.

Consequently, some methods and systems are emerged to directly capture an image of screen of a touch display. For example, the method of capturing an image of screen is similar to that of a conventional computer system. Users can capture the whole image of the screen via related settings in the portable electronic device, and the related settings may be that pressing a specific key or simultaneously pressing multiple specific keys. However, the method is inconvenient for users.

BRIEF SUMMARY OF THE INVENTION

An image capturing method and an electronic device are provided, which can capture partial image via a visual and simple operation.

The image capturing method of a touch display module includes following steps: defining a first axial; defining a second axial which is perpendicular to the first axial; detecting a motion track on the touch display module, wherein the motion track includes at least an angle or a curve; calculating a first length which is the length of the motion track projected to the first axial; calculating a second length which is the length of the motion track projected to the second axial; and capturing a selecting range according to the first length and the second length.

An electronic device is provided which includes a display module, a touch sensing unit and a processing module. The touch sensing unit is coupled with the display module and used to detect a motion track on the touch display module, wherein the motion track includes at least an angle or a curve. The processing module is coupled with the touching sensing unit, wherein the processing module defines a first axial and a second axial which is perpendicular to the first axial, calculates a first length which is the length of the motion track projected to the first axial and a second length which is the length of the motion track projected to the second axial, and captures a selecting range according to the first length and the second length.

By means of calculating a first length which is the length of the motion track projected to the first axial and a second length which is the length of the motion track projected to the second axial by the processing module, the image capturing method and the electronic device can directly capture a wider scope of selecting range according to requirements of users. Compared with the conventional method of using some hotkeys and capturing the whole image of the screen, the image capturing method and an electronic device in embodiments are more simplified, visualized and convenient to use.

The processing module can further execute other application programs such as translating characters in a selecting range, which increase the applicability of the image capturing method and the electronic device.

BRIEF DESCRIPTION OF THE DRAWINGS

FIG. 3A to FIG. 3C are schematic diagrams showing operations of an image capturing method in a first embodiment;

FIG. 4A to FIG. 4C are schematic diagrams showing operations of an image capturing method in a second embodiment;

FIG. 6A to FIG. 6C are schematic diagrams showing operations of an image capturing method in a third embodiment;

FIG. 7A to FIG. 7C are schematic diagrams showing operations of an image capturing method in a fourth embodiment;

FIG. 8A to FIG. 8C are schematic diagrams showing operations of an image capturing method in a fifth embodiment.

DETAILED DESCRIPTION OF THE EMBODIMENTS

Figure 1:
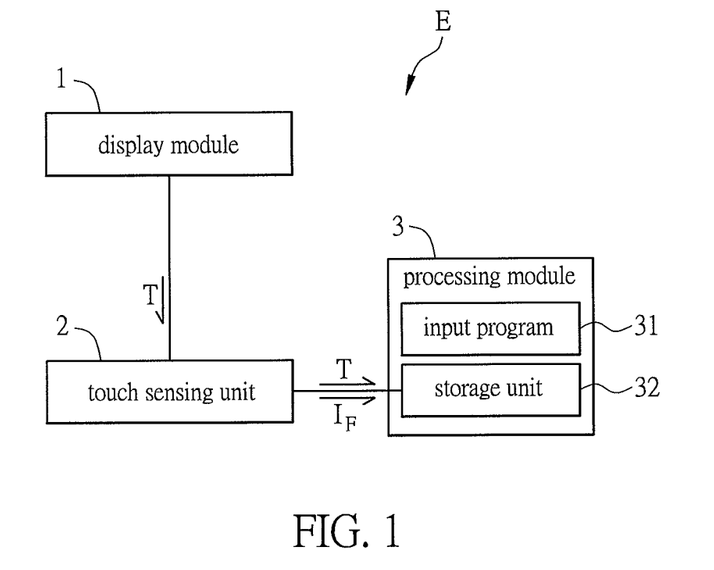
FIG. 1 is a schematic diagram showing a system block of an electronic device in a first embodiment.

FIG. 1 is a schematic diagram showing a system block of an electronic device in a first embodiment. As shown in FIG. 1, the image capturing method is applied to an electronic device E with a display module 1, such as a smart phone, a tablet computer or other electronic devices with a touch display module, which is not limited herein. The electronic device E includes a display module 1, a touch sensing unit 2 and a processing module 3. The touch sensing unit 2 cooperates with the display module 1, and it is coupled to the display module 1. In other words, the display module 1 and the touch sensing unit 2 together forms the touch display module. In practical application, the touch sensing unit 2 can be an external touch sensing unit or an embedded touch sensing unit. In the embodiment, the touch sensing unit 2 is disposed at the surface of the display module 1, when a user touches the touch sensing unit 2 with fingers or a stylus, the touch sensing unit 2 can detect the motion track T of the fingers or the stylus on the display module 1. The processing module 3 is coupled to the touch sensing unit 2, it receives and calculates the detected motion track T, and generates a selecting range (as shown in FIG. 3B).

Figure 2:
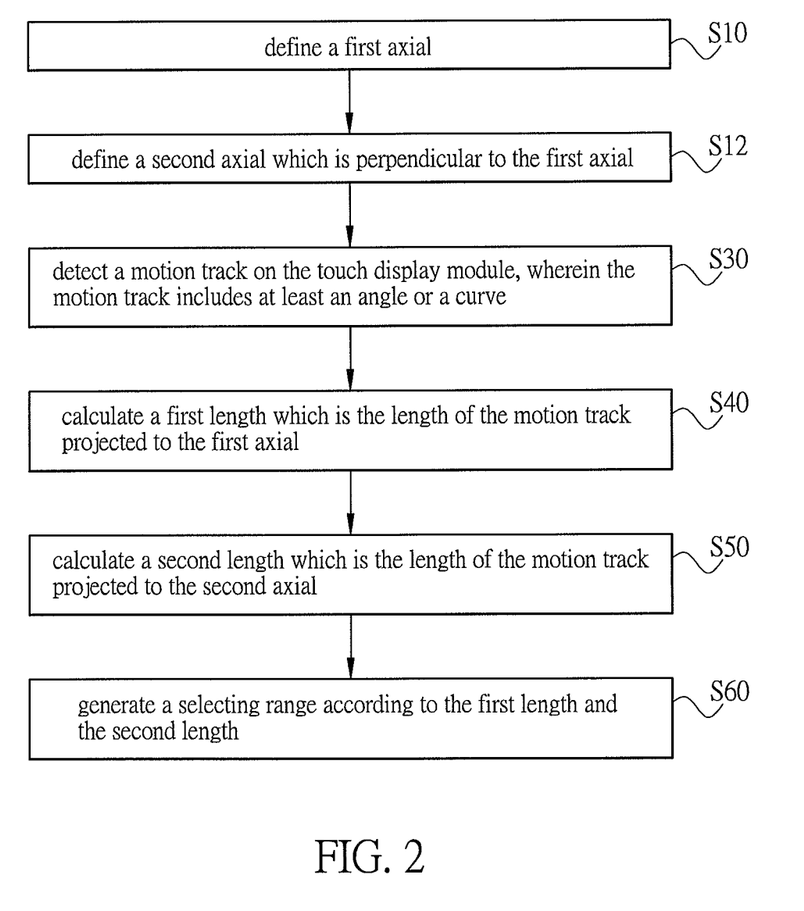
FIG. 2 is a flow chart diagram showing an image capturing method in a first embodiment.

FIG. 2 is a flow chart diagram showing an image capturing method in a first embodiment. As shown in FIG. 2, the image capturing method of the embodiment includes following steps: defining a first axial (S10); defining a second axial which is perpendicular to the first axial (S12); detecting a motion track on the touch display module, the motion track includes at least an angle or a curve (S30); calculating a first length which is the length of the motion track projecting to the first axial (S40); calculating a second length which is the length of the motion track projecting to the second axial (S50); and generating a selecting range according to the first length and the second length (S60).

Figure 3A:
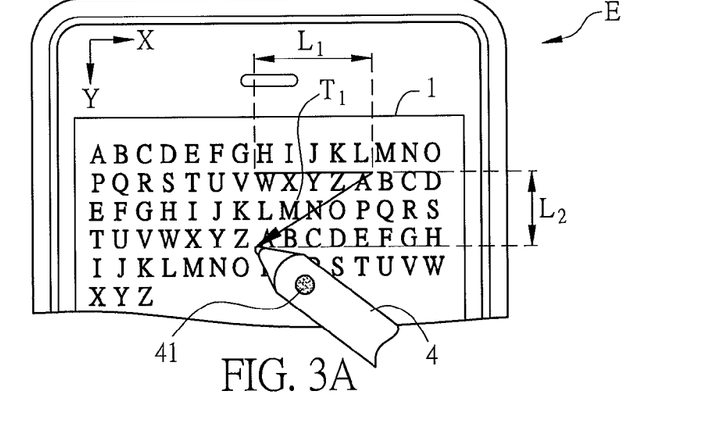
Figure 3B:
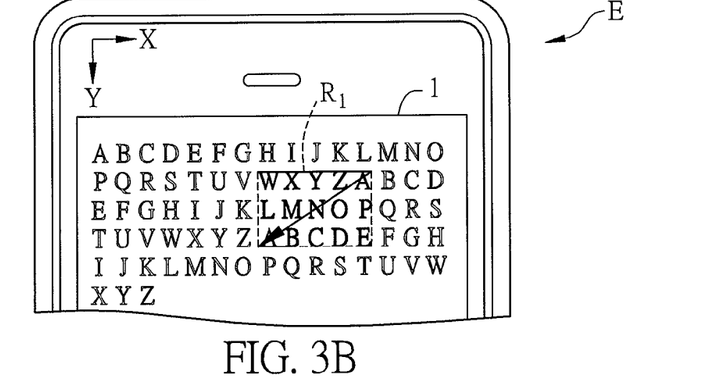
Figure 3C:
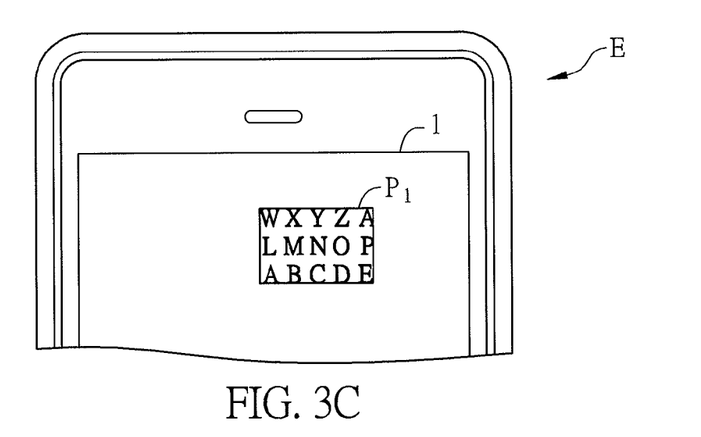

FIG. 3A to FIG. 3C are schematic diagrams showing the operation of an image capturing method in a first embodiment. As shown in FIG. 1 to FIG. 3C, the steps S10 and S12 are executed by the processing module 3, the processing module 3 defines a first axial X and a second axial Y which is perpendicular to the first axial (as shown in FIG. 3A). In practical application, while the display direction of the electronic device E may be rotated when users use the electronic device E, the horizontal axial can be defined as the first axial X and the vertical axis can be defined as the second axis Y, which are determined by the inertial sensor of the electronic device E.

Figure 4A:
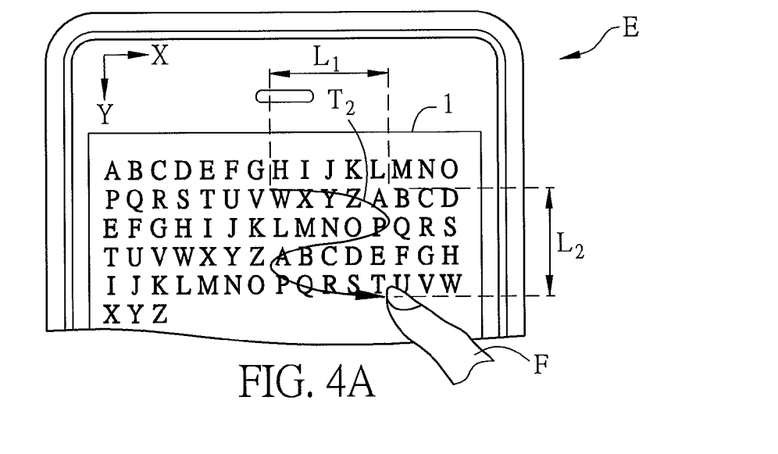
Figure 4B:
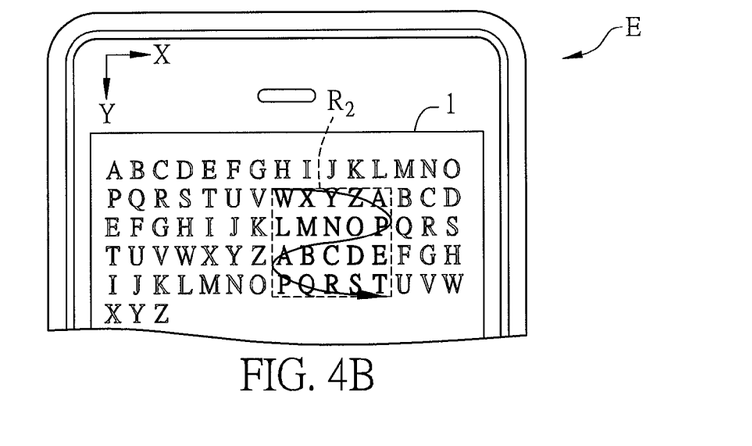
Figure 4C:
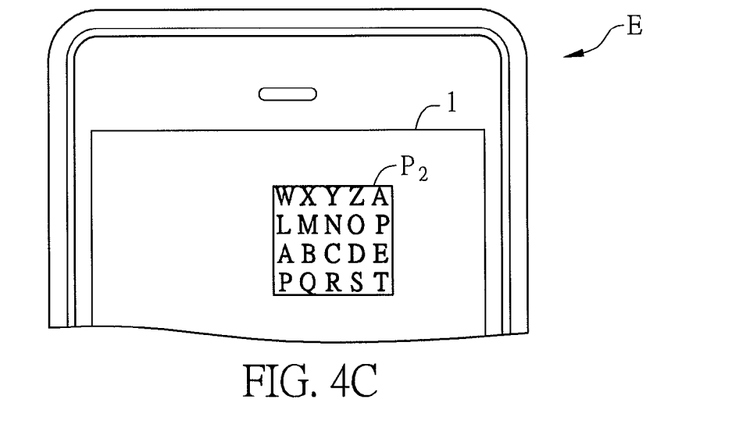

In the step S30, as shown in FIG. 1, the electronic device E has a touch sensing unit 2, the touch sensing unit 2 can detect the motion track T on the display module 1, and the motion track T includes at least an angle or a curve. In a first embodiment, as shown in FIG. 3A, the motion track T1 includes an angle. FIG. 4A to FIG. 4C are schematic diagrams showing the operation of an image capturing method in a second embodiment, as shown in FIG. 4A, the motion track T2 is an arc curve, in other words, the motion track T (T1,T2) is a nonlinear line. After the motion track T is formed on the surface of the display module 2, the touch sensing unit 2 detects the motion track T and transfers the detection signal to the processing module 3, and the processing module 3 executes the step S40 to S60.

In step S40, a processing module 3 can calculate a first length L1 which is the length of the motion track T1 (or T2) projected to the first axial X according to the defined first axial X and the second axial Y, and in step S50, the processing module 3 calculates a second length L2 which is the length of the motion track T1 (or T2) projected to the second axial Y. In the step S60, as shown in FIG. 3B or FIG. 4B, the processing module 3 generates a selecting range R1 (R2) according to the first length L1 and the second length L2; as shown in FIG. 3C or FIG. 4C, the processing module captures an image P1 (P2) in the selecting range R1 (R2). Furthermore, the image P1 (P2) can be transferred to other application programs to be edited or stored after being captured.

Figure 5:
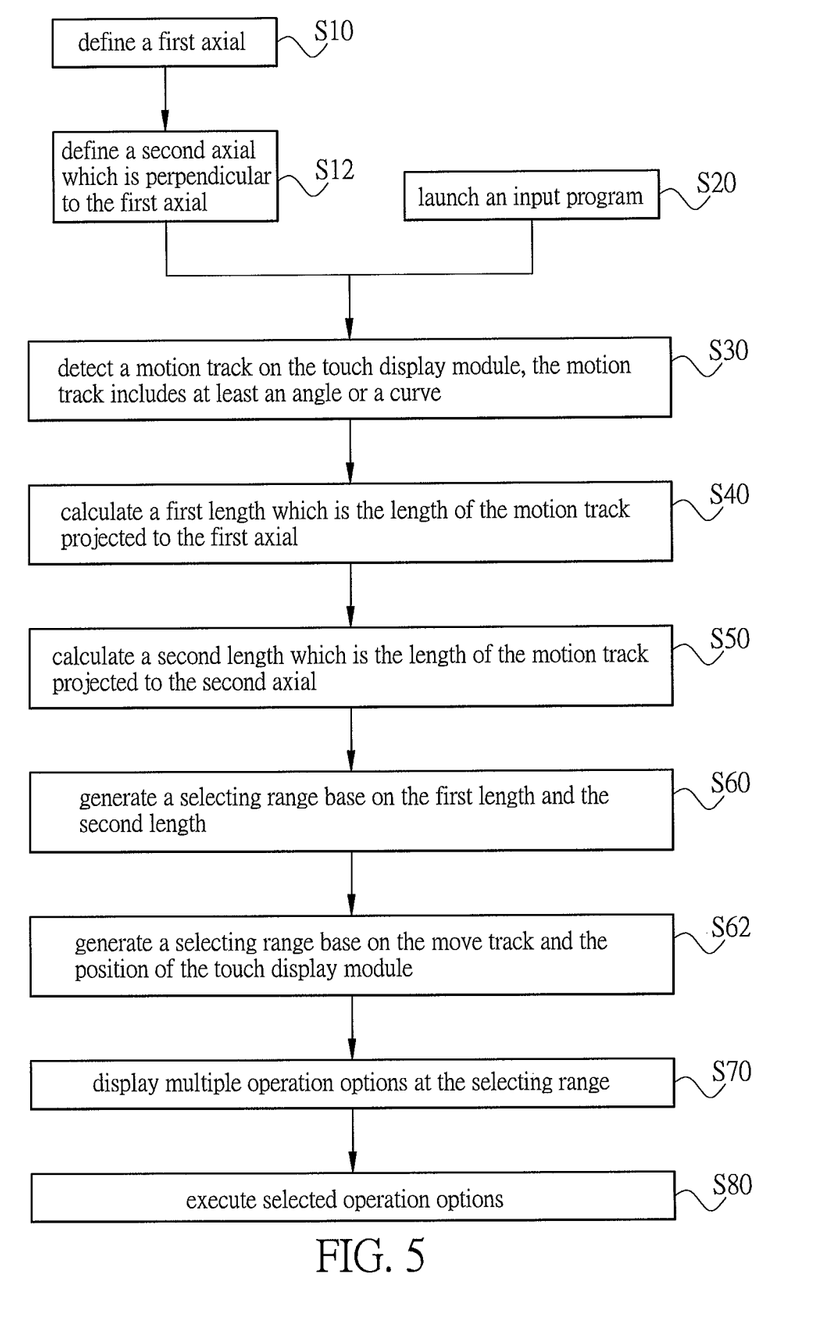
FIG. 5 is a flow chart diagram showing an image capturing method in another embodiment.

FIG. 5 is a flow chart diagram showing an image capturing method in another embodiment. As shown in FIG. 1 and FIG. 5, before the step S30, the method further includes step S20, that is, launching an input program 31. Detailly speaking, the input program 31 is an application program and is executed by the processing module 3. In practical application, the input program 31 has a corresponding icon (not shown) displayed at the display module 1, and users can launch the input program 31 by directly clicking the icon, or the users can launch the input program 31 by pressing a specific key of the electronic device E.

In the first embodiment, as shown in FIG. 3A, the electronic device 1 further includes a stylus 4 which has a key 41, and users can launch the input program 31 by pressing the key 41. After the input program 31 is launched, users can use the stylus 4 to touch or get close to the surface of the touch sensing unit 2, and then generate a specific motion track T which can be detected by the touch sensing unit 2. In the first embodiment, the move track T1 is operated and generated on the surface of the display module 1 by the stylus 4.

Furthermore, in the second embodiment, as shown in FIG. 4A, the move track T2 is directly generated on the surface of the display module 1 by a finger F. By setting the electronic device E, the finger F can input program by getting close to the surface of the display module 1 instead of directly touching the surface of the display module 1, and the finger F must get close enough to generate the move track T2 which can be detected by the touch sensing unit 2. In the first embodiment, the stylus 4 and the move track T1 having an angle are taken as an example, which is not limited herein. The stylus can generate a move track T which having any angle or curve, which is not limited herein.

As shown in FIG. 5, the image capturing method further includes step S62, generating a selecting range according to the position of the move track at the touch display module. A shown in FIG. 1, the processing module 3 further includes a storage unit 32 which can temporarily store all the coordinate values of the move track T on the display module 1.

In the step S60 and step S62 of the first embodiment, as shown in FIG. 1 and FIG. 3A to FIG. 3C, the processing module 3 calculates a first length L1 and a second length L2 according to the coordinate values of the move track T1, and determines the selected size of the selecting range R1 and generates the selecting range R1 including the move track T1 according to the position of the move track T1 on the surface of the display module 1. Furthermore, the shape of the selecting range R1 is not limited herein, and it may be a rectangle, a circle or an oval. The shape of the selected range R1 is a rectangle in the first and the second embodiments.

Figure 6A:
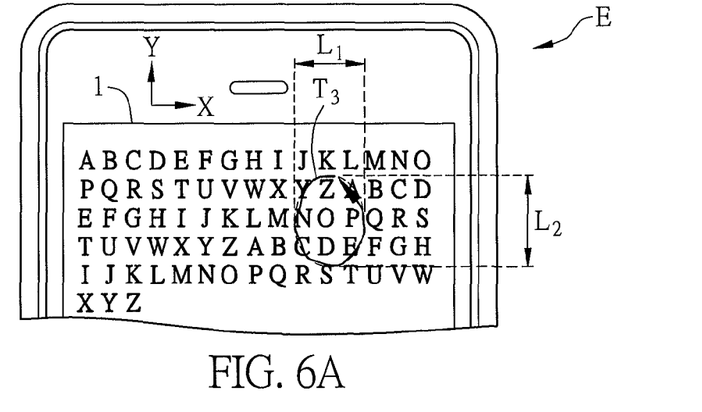
Figure 6B:
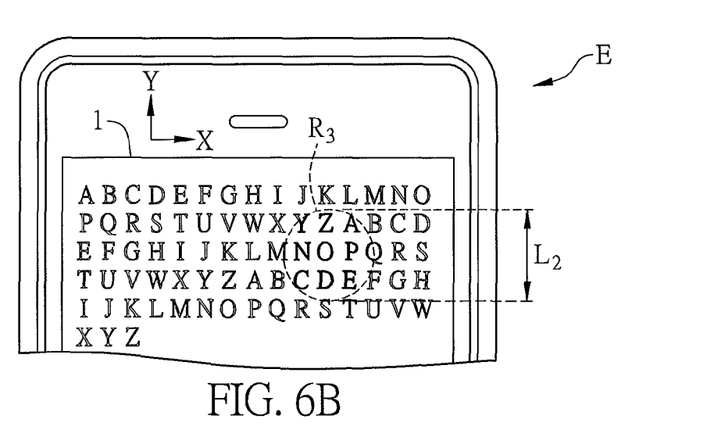
Figure 6C:
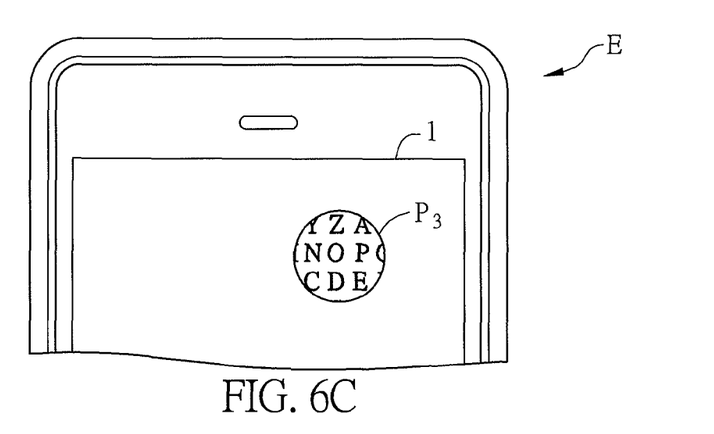

FIG. 6A to FIG. 6C are schematic diagrams showing the operation of an image capturing method in a third embodiment. As shown in FIG. 1 and FIG. 6A to FIG. 6C, when the move track T3 detected by the processing module 3 is a circle, the length of the first length L1 and the second length L2 are compared, and the longer one is selected as a diameter of a circular selecting range R3. As shown in FIG. 6A, the second length L2 of the move track T3 is longer in the third embodiment, therefore, the second length L2 is selected as a diameter to form a circular selecting range R3, and the selecting range R3 is captured to generate an image P3. Similarly, the image P3 covers the track of the move track T3.

Figure 7A:
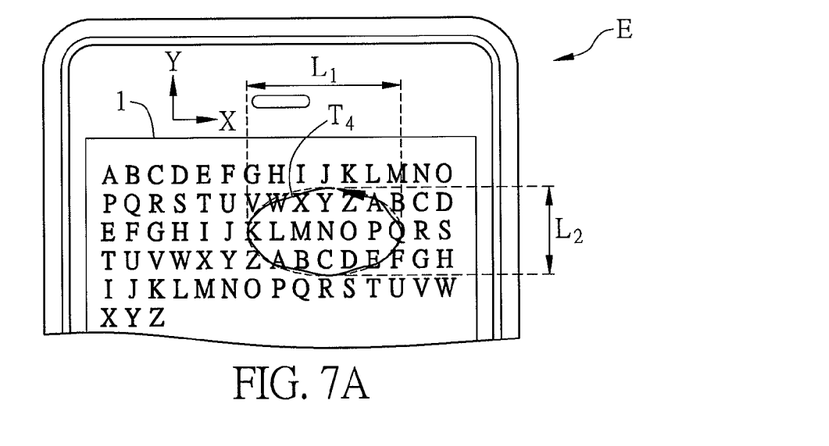
Figure 7B:
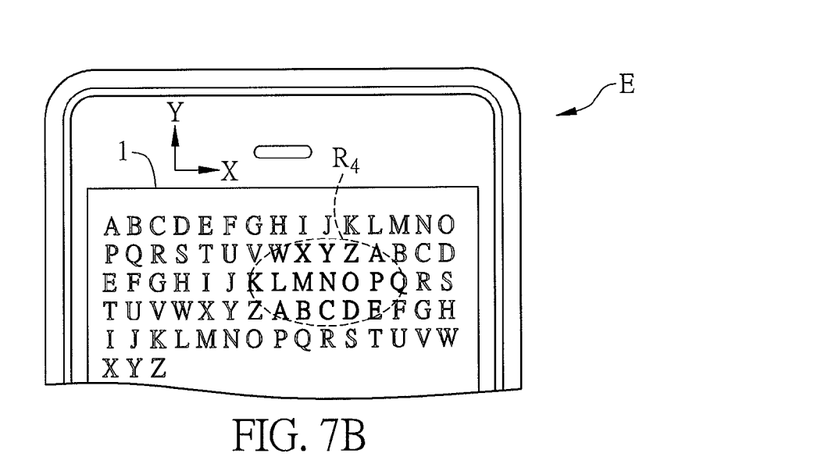
Figure 7C:
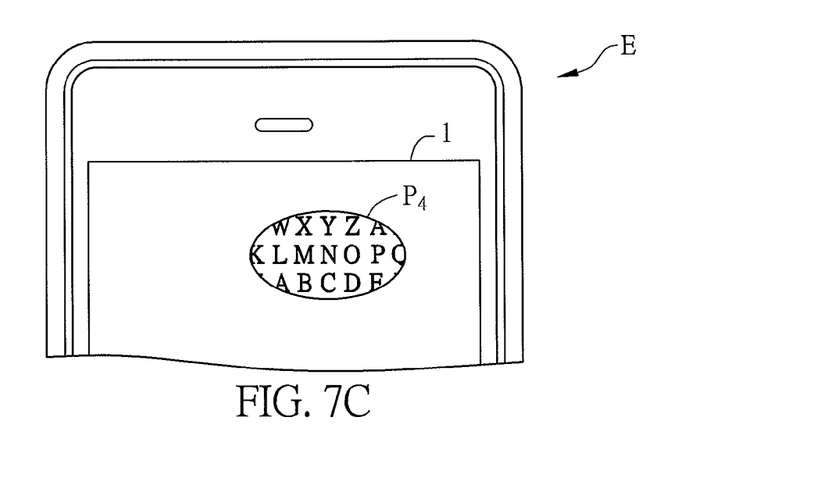

FIG. 7A to FIG. 7C are schematic diagrams showing the operation of an image capturing method in a fourth embodiment. When the move track T4 detected by the processing module 3 is an oval, the first length L1 and the second length L2 are compared, and a longer one (the first length L1) of the first length L1 and the second length L2 is selected as a long axis, and the other length (the second length L2) is selected as a short axis, the long axis and the short axis form an elliptic selecting range R4.

Other steps of the capturing image method can refer to the above embodiment, which is omitted herein for a concise purpose. The circle or the oval shape is determined by processing module 3 according to the principle of Hough Transform (HT) principle or other processing principles which randomly selects multiple coordinate values of the move track T3 and T4. In order to keep the drawings concise, it does not show that the stylus 4 or fingers F draws the move track T3 and T4 in FIG. 6A and FIG. 7A.

Figure 8A:
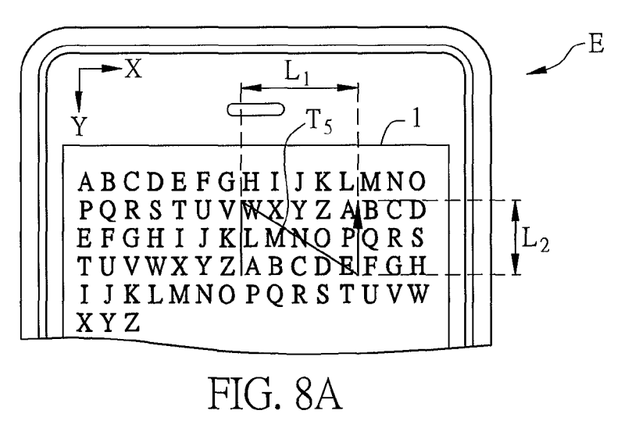
Figure 8B:
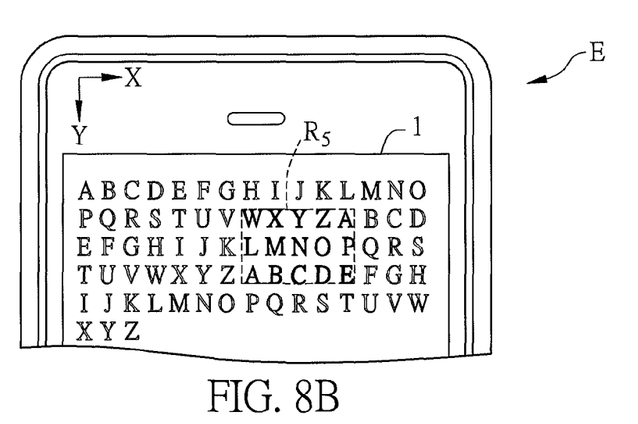
Figure 8C:
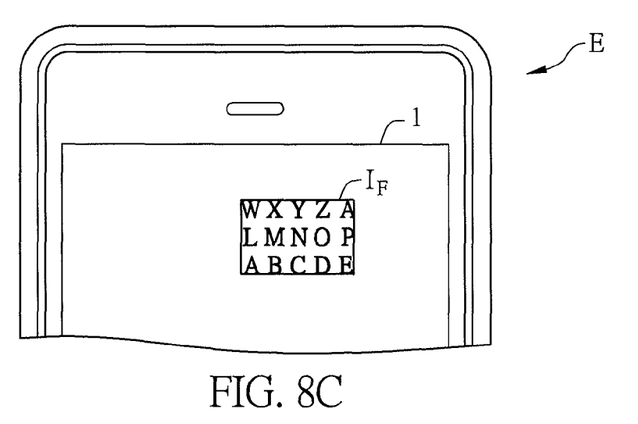

FIG. 8A to FIG. 8C are schematic diagrams showing the operation of an image capturing method in a fifth embodiment. As shown in FIG. 1 and FIG. 8A to FIG. 8C, the processing module 3 directly transforms the selecting range to an image profile according to the shape of the move track T (T5), the shape of the move track T5 may be N-shaped, M-shaped, Z-shaped or S-shaped, which is not limited herein. As shown in FIG. 8A, the shape of the move track T5 is N-shaped, the processing module 3 can directly transform the selecting range R5 to an image profile $I_F$ and store the image profile $I_F$ to the storage unit 32 regardless of the display image on the display module 1 is a picture, a video or a text. Other steps of the capturing image method can refer to the above embodiment which is omitted herein.

Figure 9A:
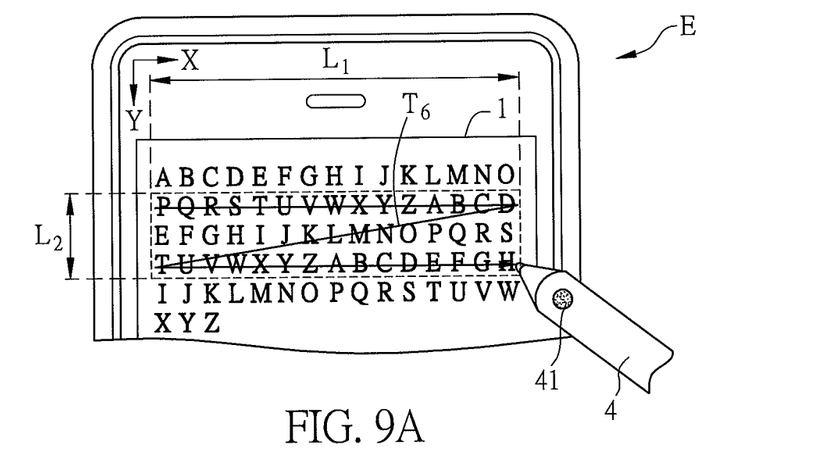
FIG. 9A to FIG. 9B are schematic diagrams showing operations of an image capturing method in a sixth embodiment.
Figure 9B:
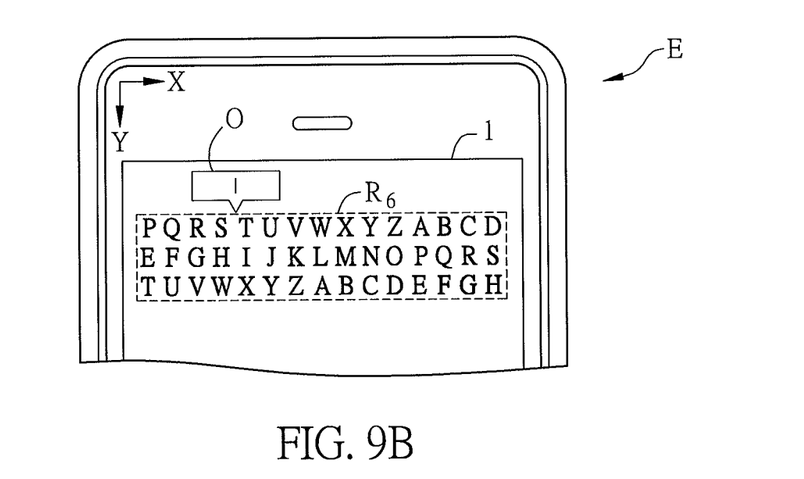

Furthermore, the image capturing method and the electronic device include the function of translating the text of the selecting range. FIG. 9A to FIG. 9B are schematic diagrams showing the operation of an image capturing method in a sixth embodiment. As shown in FIG. 5 and FIG. 9A to FIG. 9C, the image capturing method further includes: displaying multiple operation options at the selecting range (S70); and executing a selected operation option (S80).

As shown in FIG. 9A, if a text file is displayed on the display module 1, the move track T6 is generated on surface of the display module 1 when the key 41 of the stylus 4 is pressed. The processing module 3 calculates a first length L1 and a second length L2, and generates a selecting range R6 according to the position of the motion track. The processing module 3 displays multiple operation options O at the selecting range R6 (step S70), and the operation options O may be copying, pasting, zooming or translation which can be selected by users according to their demands. If the operation option is "translation, when the operation option O of a translation is selected, the processing module 3 launches and executes an application program of translation. A pop window is popped to display the translation result after translating the selecting range R6, or a translation result is displayed to replace the original selected text for users, which is not limited herein.

Furthermore, when the display image on the display module 1 is a picture, that is, the selecting range R6 is a picture, the processing module 3 can execute an OCR (Optical Character Recognition) function to recognize the characters in the picture. The processing module 3 can further execute a translation application program to translate the characters in the picture, and displays the translation result in other window for users. Thus, the image capturing method can capture text data in a large range without operating many times, that is, the characters crossing many lines can be captured by an oblique line or a curve.

In conclusion, according to the image capturing method and the electronic device in embodiments, text data in a large range can be directly captured according to the requirements of users, by means of calculating a first length which is the length of the motion track projected to the first axial and a second length which is the length of the motion track projected to the second axial by a processing module. Compared with the conventional method of using some hotkeys and capturing the whole image of the screen, the image capturing method and the electronic device in embodiments are more simplified, visualized and convenient to use.

The processing module can further execute other application program such as translating characters in a selecting range, which increase the applicability of the image capturing method and the electronic device.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An image capturing method of a touch display module includes following steps:
   defining a first axial;
   defining a second axial which is perpendicular to the first axial;
   detecting a motion track on the touch display module, wherein the motion track includes at least an angle or a curve;
   calculating a first length which is the length of the motion track projected to the first axial;
   calculating a second length which is the length of the motion track projected to the second axial; and
   comparing the first length with the second length,
   wherein a longer one of the first length and the second length is selected as a diameter of a circular selecting range, or a longer one of the first length and the second length is selected as a long axis, and a short one of the first length and the second length is selected as a short axis the long axis and the short axis form an elliptic selectin range.

2. The image capturing method according to claim 1, wherein the step of capturing the selecting range according to the first length and the second length further includes:
   generating the selecting range according to the position of the motion track on the touch display module.

3. The image capturing method according to claim 1, further comprising:
   launching an input program by pressing a key of a stylus.

4. The image capturing method according to claim 1, further comprising:
   displaying multiple operation options at the selecting range, wherein the operation options includes copying, pasting, zooming or translation.

5. The image capturing method according to claim 4, wherein when the translation is selected as the operation option, the text of the selecting range are translated.

6. The image capturing method according to claim 5, wherein when the selecting range is a picture, an optical character recognition (OCR) system is executed to recognize words in the image, and the words are translated.

7. The image capturing method according to claim 1, further comprising:
   storing the selecting range as an image according to the motion track.

8. An electronic device, comprising:
   a display module;
   a touch sensing unit coupled with the display module and used to detect a motion track on the touch display module, wherein the motion track includes at least an angle or a curve; and
   a processing module coupled with the touch sensing unit, wherein the processing module defines a first axial and a second axial which is perpendicular to the first axial, calculates a first length which is the length of the motion track projected to the first axial and a second length which is the length of the motion track projected to the second axial, and compares the first length with the second length,
   wherein a longer one of the first length and the second length is selected as a diameter of a circular selecting range, or a longer one of the first length and the second length is selected as a long axis, and a short one of the first length and the second length is selected as a short axis, the long axis and the short axis form an elliptic selecting range.

9. The electronic device according to claim 8, wherein the processing module further generates the selecting range according to the position of the motion track on a touch display module, and the touch display module includes the display module and the touch sensing unit.

10. The electronic device according to claim 8, further comprising:
 a stylus having a key, wherein an input program is launched when the key is pressed.

11. The electronic device according to claim 8, wherein the processing module further comprises:
 displaying multiple operation options at the selecting range, and the operation options includes one or a combination of copying, pasting, zooming or translation.

12. The electronic device according to claim 11, wherein when the translation is selected as the operation option, words in the selecting range are translated.

13. The electronic device according to claim 12, wherein when the selecting range is a picture, an optical character recognition (OCR) system is executed to recognize words in the image, and the words are translated.

14. The electronic device according to claim 8, wherein the processing module further includes a storage unit, the processing module converts the selecting range to an image file according to the motion track and transfers the image file to the storage unit.

\* \* \* \* \*